(12) United States Patent
Yoshimoto (10) Patent No.: US 11,847,368 B2
(45) Date of Patent: Dec. 19, 2023

(54) REGISTERED DATA EDITING METHOD, REGISTERED DATA EDITING APPARATUS THAT EDITS ALL OF A PLURALITY OF PIECES OF INDIVIDUAL REGISTERED DATA WHICH INCLUDES AT LEAST DEPARTMENT DATA, AND IMAGE PROCESSING APPARATUS

(71) Applicant: KYOCERA Document Solutions Inc., Osaka (JP)

(72) Inventor: Yusuke Yoshimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/935,469

(22) Filed: Sep. 26, 2022

(65) Prior Publication Data
US 2023/0112224 A1 Apr. 13, 2023

(30) Foreign Application Priority Data
Sep. 28, 2021 (JP) .................................. 2021-157366

(51) Int. Cl.
*G06F 3/12* (2006.01)
*G06F 21/60* (2013.01)

(52) U.S. Cl.
CPC .......... *G06F 3/1238* (2013.01); *G06F 3/1222* (2013.01); *G06F 21/608* (2013.01); *G06F 3/1231* (2013.01)

(58) Field of Classification Search
None
See application file for complete search history.

(56) References Cited

U.S. PATENT DOCUMENTS

| | | | | |
|---|---|---|---|---|
| 8,832,826 | B2* | 9/2014 | Kamasuka | G06F 21/608 358/1.15 |
| 2011/0170128 | A1* | 7/2011 | Takahashi | G06F 3/122 358/1.13 |
| 2016/0004492 | A1* | 1/2016 | Lin | G06F 3/1239 358/1.13 |
| 2017/0230542 | A1* | 8/2017 | Omori | H04N 1/32106 |
| 2019/0258427 | A1* | 8/2019 | Hosoda | G06F 3/1285 |

FOREIGN PATENT DOCUMENTS

JP 2009065540 A 3/2009

* cited by examiner

*Primary Examiner* — Haris Sabah
(74) *Attorney, Agent, or Firm* — Alleman Hall Creasman & Tuttle LLP (57) ABSTRACT

When a piece of management department data of target manager data is non-restriction data corresponding to all departments, a processor executes a first data editing process to edit all of a plurality of pieces of individual user data. When the piece of management department data of the target manager data is restriction data corresponding to a particular department, a processor executes a second data editing process to edit particular user data that is a part of the plurality of pieces of individual user data. The particular user data is one of the plurality of pieces of individual user data that includes a piece of belonging department data that indicates a department that has a predetermined correspondence relation with the particular department that corresponds to the piece of management department data of the target manager data.

5 Claims, 4 Drawing Sheets

REGISTERED DATA EDITING METHOD, REGISTERED DATA EDITING APPARATUS THAT EDITS ALL OF A PLURALITY OF PIECES OF INDIVIDUAL REGISTERED DATA WHICH INCLUDES AT LEAST DEPARTMENT DATA, AND IMAGE PROCESSING APPARATUS

INCORPORATION BY REFERENCE

This application is based upon and claims the benefit of priority from the corresponding Japanese Patent Application No. 2021-157366 filed on Sep. 28, 2021, the entire contents of which are incorporated herein by reference.

BACKGROUND

The present disclosure relates to a registered data editing method, a registered data editing apparatus, and an image processing apparatus in which a processor executes a registered data editing process.

There is known an image processing apparatus that performs a log-in process and permits a user to execute an image processing only when the log-in process is successful.

The image processing includes a print process to form an image on a sheet, or an image reading process to read an image from a document sheet. The image processing apparatus is, for example, a printer, a copier, a facsimile apparatus, or a multifunction peripheral.

When a piece of input authentication data is input, the image processing apparatus executes the log-in process. In the log-in process, the image processing apparatus accesses registered data to search for a piece of registered authentication data that matches the piece of input authentication data.

The registered data includes a plurality of pieces of user data that corresponds to a plurality of users who use the image processing apparatus. When the registered data includes the piece of registered authentication data that matches the piece of input authentication data, the image processing apparatus executes the image processing in accordance with a processing request that is input.

In addition, the registered data may include usable range data that indicates, for each of the plurality of users, a range of usable functions. In this case, the image processing apparatus executes the image processing in accordance with the processing request, in the range indicated by the usable range data.

In addition, the registered data may include manager data that is associated with any one of the plurality of pieces of user data. The manager data indicates that a user corresponding thereto is an apparatus manager. In this case, the image processing apparatus or an apparatus that can communicate with the image processing apparatus functions as a data editing apparatus that edits the registered data.

A management device that manages access to the registered data, executes the log-in process when a piece of input authentication data has been input. Furthermore, when one of the plurality of pieces of user data includes a piece of registered authentication data that matches the piece of input authentication data, and the one of the plurality of pieces of user data corresponds to the apparatus manager, the management device permits the data editing apparatus to execute the data editing process.

For example, the data editing apparatus executes the data editing process in a state where all of the plurality of pieces of user data are the editing target, in accordance with an editing input operation performed on an operation device.

In addition, when the log-in process fails continuously, the user may be locked out. In addition, in the registered data, an authority to release the lockout for a particular user group may be set to a general user, not to the apparatus manager.

SUMMARY

A registered data editing method according to an aspect of the present disclosure is a method in which a processor executes a process to edit registered data that is accessed by an image processing apparatus. The registered data editing method is executed when the registered data includes a plurality of pieces of individual user data and a plurality of pieces of manager data. The plurality of pieces of individual user data correspond to a plurality of users who use the image processing apparatus, and each of the plurality of pieces of individual user data includes registered authentication data and belonging department data. The plurality of pieces of manager data are associated with any of the plurality of pieces of individual user data, and each of the plurality of pieces of manager data includes management department data that corresponds to all departments or a particular department. The registered data editing method includes the processor, when input authentication data has been input, identifying target user data that is one of the plurality of pieces of individual user data and includes a piece of registered authentication data that matches the input authentication data. Furthermore, the registered data editing method includes the processor identifying target manager data that is one of the plurality of pieces of manager data that is associated with the target user data. Furthermore, the registered data editing method includes the processor, when a piece of management department data of the target manager data is non-restriction data corresponding to all departments, executing a first data editing process to edit all the plurality of pieces of individual user data in accordance with an editing input performed on an operation device. Furthermore, the registered data editing method includes the processor, when the piece of management department data of the target manager data is restriction data corresponding to the particular department, executing a second data editing process to edit particular user data that is a part of the plurality of pieces of individual user data in accordance with the editing input. The particular user data is one of the plurality of pieces of individual user data that includes a piece of belonging department data that indicates a department that has a predetermined correspondence relation with the particular department that corresponds to the piece of management department data of the target manager data.

A registered data editing apparatus according to another aspect of the present disclosure includes the processor that realizes the registered data editing method.

An image processing apparatus according to a further aspect of the present disclosure includes an image processing portion, a control portion, and the registered data editing apparatus. The image processing portion is configured to execute image processing that includes a print process to form an image on a sheet. The control portion controls the image processing portion. When the input authentication data has been input and the plurality of pieces of individual user data includes the piece of registered authentication data that matches the input authentication data, the control portion causes the image processing portion to execute the image processing in accordance with a processing request that is input.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming System 100]

An image forming system 100 includes one or more image processing apparatuses 10 and one or more host apparatuses 8.

The image processing apparatus 10 is configured to execute image processing that includes at least a print process. In the print process, an image is formed on a sheet 91.

Figure 1:
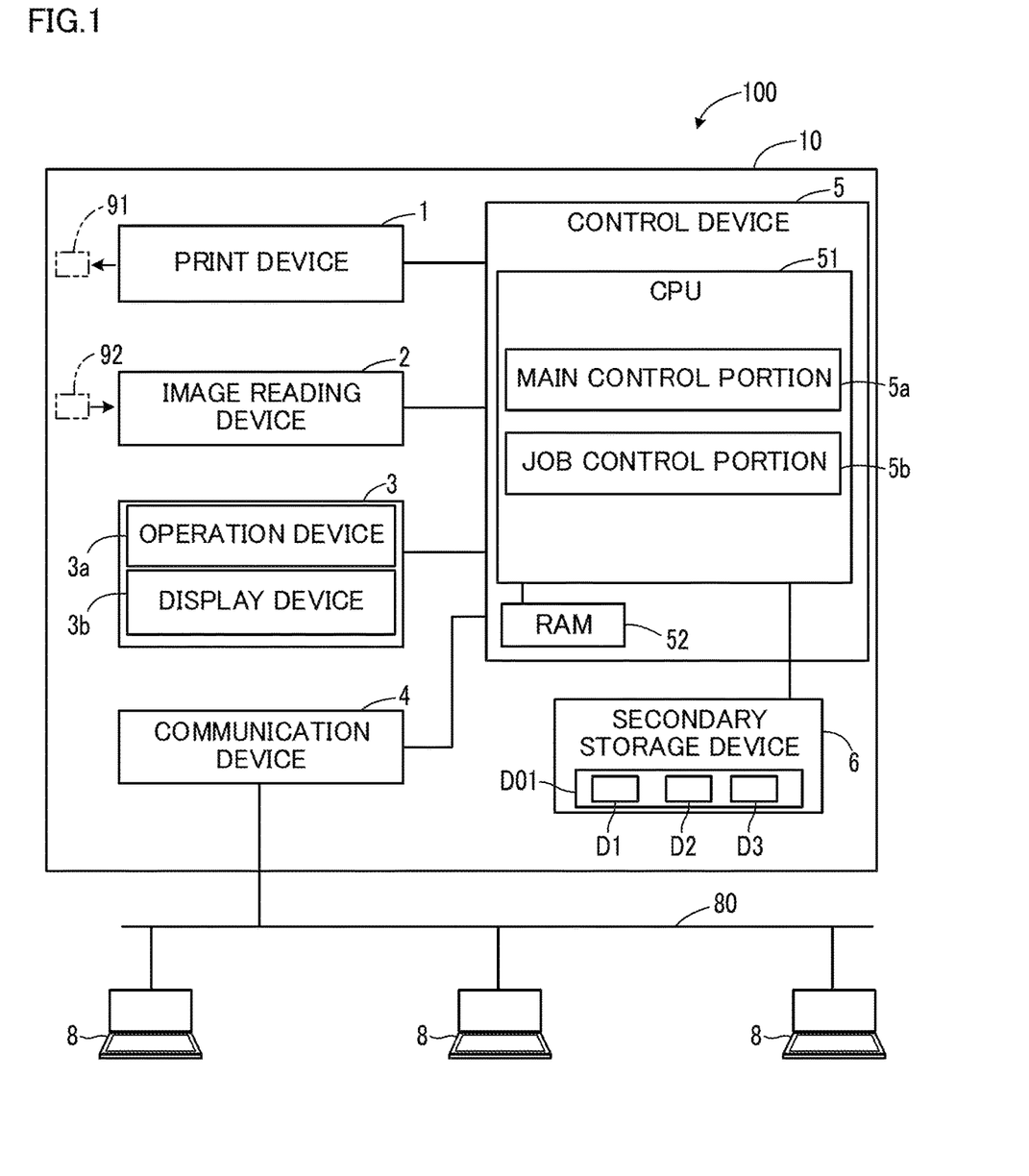
FIG. 1 is a block diagram showing a configuration of an image processing system including a host apparatus that is an example of a data editing apparatus according to an embodiment of the present disclosure.

In the present embodiment, the image processing apparatus 10 includes a print device 1 and an image reading device 2, wherein the print device 1 executes the print process, and the image reading device 2 executes an image reading process (see FIG. 1).

The print device 1 executes the print process by a predetermined method such as an electrophotographic method or an inkjet method. In the image reading process, an image is read from a document sheet 92.

For example, the image processing apparatus 10 is a copier, a facsimile apparatus, or a multifunction peripheral. The multifunction peripheral has functions of the copier and the facsimile apparatus.

The host apparatus 8 is configured to communicate with the image processing apparatus 10. The host apparatus 8 generates print data, and sends, together with the print data, a print request to the image processing apparatus 10.

Furthermore, the host apparatus 8 is configured to execute a data editing process to edit registered data DO1 that is accessed by the image processing apparatus 10. The host apparatus 8 is an example of a data editing apparatus that executes the data editing process.

The image processing apparatus 10 is configured to communicate with the host apparatus 8 via a network 80 such as a LAN (Local Area Network), a WAN (Wide Area Network), or the Internet.

As shown in FIG. 1, the image processing apparatus 10 includes the print device 1, the image reading device 2, a user interface device 3, a communication device 4, a control device 5, and a secondary storage device 6. The control device 5 includes a CPU 51 and a RAM (Random Access Memory) 52.

The user interface device 3 includes an operation device 3a and a display device 3b. The operation device 3a is configured to receive human operations. For example, the operation device 3a includes operation buttons and a touch panel. The display device 3b is configured to display information. For example, the display device 3b includes a display panel such as a liquid crystal panel The communication device 4 is a communication interface device that performs communication with other apparatuses such as the host apparatus 8 via the network 80. The control device 5 performs data transmissions and receptions with the other apparatuses all via the communication device 4.

In the following description, the image read in the image reading process by the image reading device 2 from the document sheet 92 is referred to as a read image.

The print device 1 is configured to execute the print process based on: data of the read image; or the print request received from an information terminal (not shown) via the communication device 4.

In addition, the communication device 4 is configured to execute an image data transmission process to transmit the data of the read image to a specified destination via the network 80.

The control device 5 executes various types of calculations and data processing and controls various types of electric devices included in the image processing apparatus 10.

The secondary storage device 6 is a computer-readable nonvolatile storage device. The secondary storage device 6 is configured to store computer programs and various types of data. For example, either or both of a hard disk drive and a SSD (Solid State Drive) are adopted as the secondary storage device 6.

The secondary storage device 6 stores the computer programs executed by the CPU 51 and data consulted by the CPU 51. The CPU 51 is an example of a processor.

The CPU 51 is a processor that executes various types of data processing and controls by executing the computer programs stored in the secondary storage device 6.

It is noted that, in place of the CPU 51, another processor such as a DSP may execute the data processing and controls.

The RAM 52 is a computer-readable volatile storage device. The RAM 52 primarily stores: the computer programs executed by the CPU 51; and data that is output and consulted by the CPU 51 during execution of the computer programs.

The CPU 51 includes a plurality of processing modules that are realized by executing the computer programs. The plurality of processing modules in the CPU 51 include a main control portion 5*a* and a job control portion 5*b*.

The main control portion 5*a* mainly monitors operations performed on the operation device 3*a* and data receptions performed by the communication device 4. Furthermore, upon detection of an operation performed on the operation device 3*a* or a data reception, the main control portion 5*a* controls to start a process in accordance with the detected operation or data.

Furthermore, when input authentication data is input, the main control portion 5*a* executes an authentication process on the input authentication data. For example, the input authentication data is input to the CPU 51 via the operation device 3*a* or the communication device 4.

Figure 3:
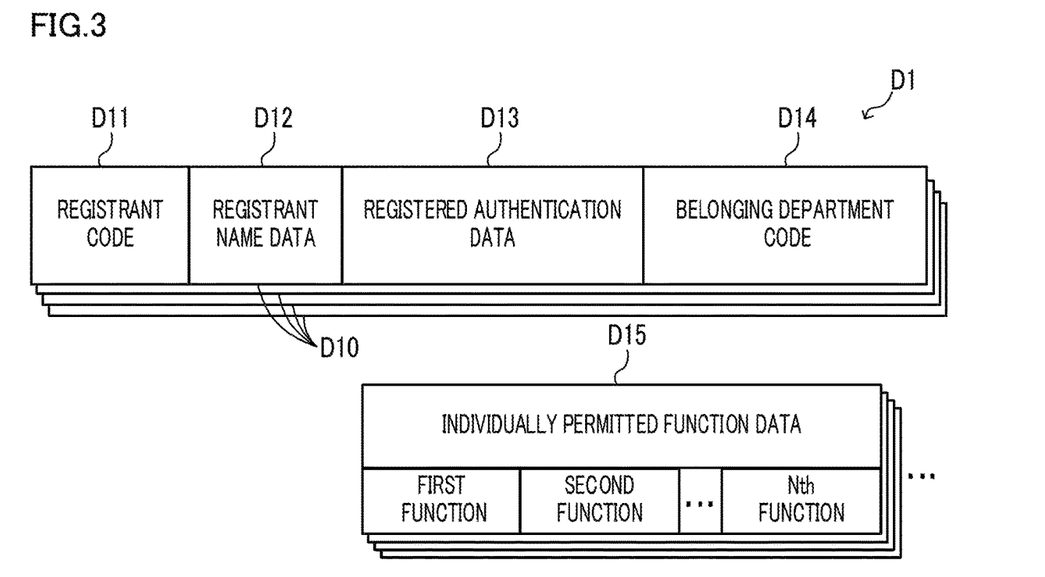
FIG. 3 is a diagram showing an example of a configuration of registered user data constituting a part of registered data that is edited by the host apparatus.

In the present embodiment, the registered data DO1 is stored in the secondary storage device 6, wherein the registered data DO1 includes registered authentication data D13 for each user (see FIG. 1, FIG. 3). The registered data DO1 is accessed by the image processing apparatus 10.

The registered data DO1 includes registered user data D1 (see FIG. 1). The registered user data D1 includes a plurality of pieces of individual user data D10 (see FIG. 3). The plurality of pieces of individual user data D10 correspond to a plurality of users who can use the image processing apparatus 10. Each of the plurality of pieces of individual user data D10 includes the registered authentication data D13 (see FIG. 3).

In the authentication process, the main control portion 5*a* compares the input authentication data with each of a plurality of pieces of registered authentication data D13.

When the input authentication data matches any one of the plurality of pieces of registered authentication data D13, it means a success of the authentication process. That is, the authentication process is successful when the plurality of pieces of individual user data D10 include a piece of registered authentication data D13 that matches the input authentication data.

On the other hand, when the input authentication data does not match any one of the plurality of pieces of registered authentication data D13, it means a failure of the authentication process.

The job control portion 5*b* controls the print device 1, the image reading device 2, and the communication device 4. When the authentication process succeeds, the job control portion 5*b* causes a part or all of the print device 1, the image reading device 2, and the communication device 4 to execute a requested image processing.

The print device 1, the image reading device 2, and the communication device 4 are an example of an image processing portion configured to execute the image processing. In the present embodiment, the image processing includes the print process, the image reading process, and the image data transmission process.

The image processing apparatus 10 is shared by a plurality of users. For example, each of the users operates a host apparatus 8 and requests, via the host apparatus 8, the image processing apparatus 10 to execute the image processing. In addition, each of the users may directly operate the operation device 3*a* to request the image processing apparatus 10 to execute the image processing.

When the authentication process has succeeded, the job control portion 5*b* causes the image processing portion to execute the image processing in accordance with a processing request that is input. For example, the processing request is input via the operation device 3*a* of the image processing apparatus 10. In addition, the processing request may be input via the host apparatus 8 and the communication device 4.

The host apparatuses 8 are computers configured to communicate with the image processing apparatus 10 via the network 80. Each of the host apparatuses 8 is configured to access the registered data DO1 via the network 80 and the communication device 4 and the CPU 51 of the image processing apparatus 10.

Figure 2:
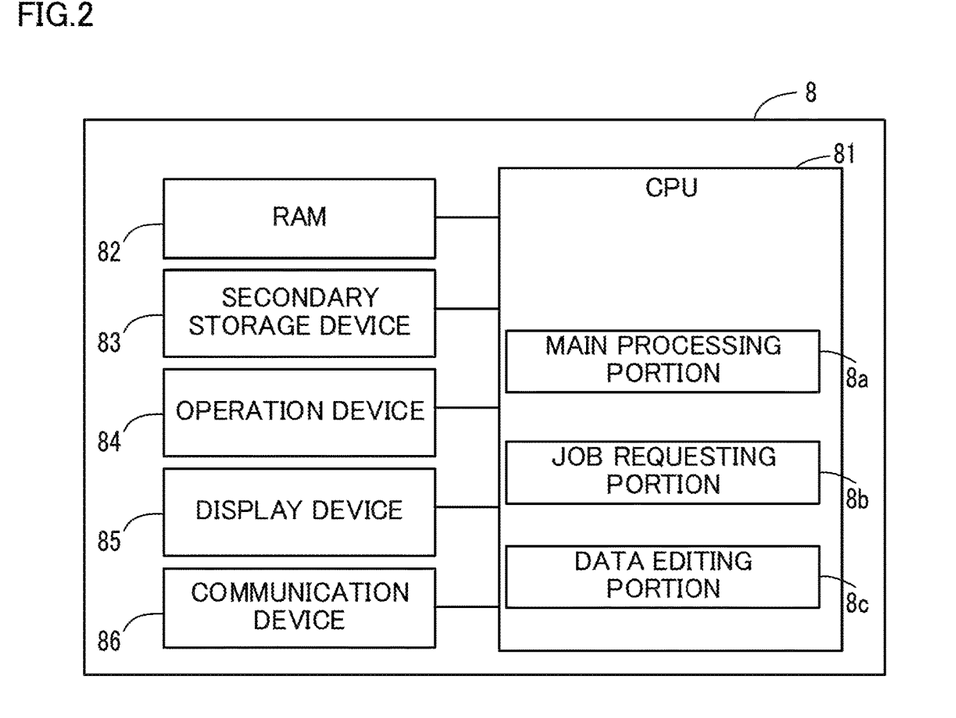
FIG. 2 is a block diagram showing a configuration of the host apparatus.

As shown in FIG. 2, the host apparatus 8 includes a CPU 81, a RAM 82, a secondary storage device 83, an operation device 84, a display device 85, and a communication device 86.

The operation device 84 is configured to receive human operations. For example, the operation device 84 includes a keyboard and a mouse. In addition, the operation device 84 may include a touch panel. The display device 85 is configured to display information. For example, the display device 85 includes a display panel such as a liquid crystal panel.

The communication device 86 is a communication interface device that performs a communication with other apparatuses such as the image processing apparatus 10 via the network 80. The CPU 81 performs data transmissions and receptions with the other apparatuses all via the communication device 86.

The secondary storage device 83 is a computer-readable nonvolatile storage device. The secondary storage device 83 is configured to store computer programs and various types of data. For example, either or both of a hard disk drive and a SSD (Solid State Drive) are adopted as the secondary storage device 83.

The secondary storage device 83 stores the computer programs executed by the CPU 81 and data consulted by the CPU 81.

The CPU 81 is a processor that executes various types of data processing and controls by executing the computer programs stored in the secondary storage device 83. The CPU 81 is an example of a processor.

The RAM 82 is a computer-readable volatile storage device. The RAM 82 primarily stores: the computer programs executed by the CPU 81; and data that is output and consulted by the CPU 81 during execution of the computer programs.

The CPU 81 includes a plurality of processing modules that are realized by executing the computer programs. The plurality of processing modules in the CPU 81 include a main processing portion 8*a*, a job requesting portion 8*b*, and a data editing portion 8*c*.

The main processing portion 8*a* performs a control to start various types of processes in accordance with an operation performed on the operation device 84, and a control of the display device 85.

The job requesting portion 8*b* generates data of the print job. Furthermore, the job requesting portion 8*b* transmits the data of the print job to the image processing apparatus 10 via the communication device 86. Transmitting the data of the print job to the image processing apparatus 10 is an example of a request for the image processing apparatus 10 to execute the image processing.

The data editing portion 8*c* executes a registered data editing process. In the registered data editing process, the registered data DO1 stored in the secondary storage device 6 of the image processing apparatus 10 is edited.

The registered data DO1 includes the registered user data D1 (see FIG. 1). The registered user data D1 is data on the plurality of users who can use the image processing apparatus 10. The registered user data D1 includes the registered authentication data D13 for each of the users (see FIG. 3).

Furthermore, the registered data DO1 includes management master data D3 (see FIG. 1). The management master data D3 indicates an apparatus manager who is one of the plurality of users registered in the registered user data D1.

The main control portion 5a of the image processing apparatus 10 executes the log-in process when the input authentication data is input. In the present embodiment, the CPU 51 of the image processing apparatus 10 is an example of a management device that manages accesses to the registered data D01.

Furthermore, when, among the plurality of pieces of user data, a piece of user data that includes a piece of registered authentication data that matches the input authentication data, corresponds to the apparatus manager, the main control portion 5a permits the host apparatus 8 to execute the registered data editing process.

Meanwhile, when only the apparatus manager has an authority to edit the registered data D01, load of the apparatus manger is large. In particular, when the apparatus manger edits data relating to a user who belongs to a department that is not directly related to the apparatus manager, the apparatus manager tends to feel a large load.

On the other hand, having too many apparatus managers is not desirable in managing the image processing apparatus 10.

Figure 6:
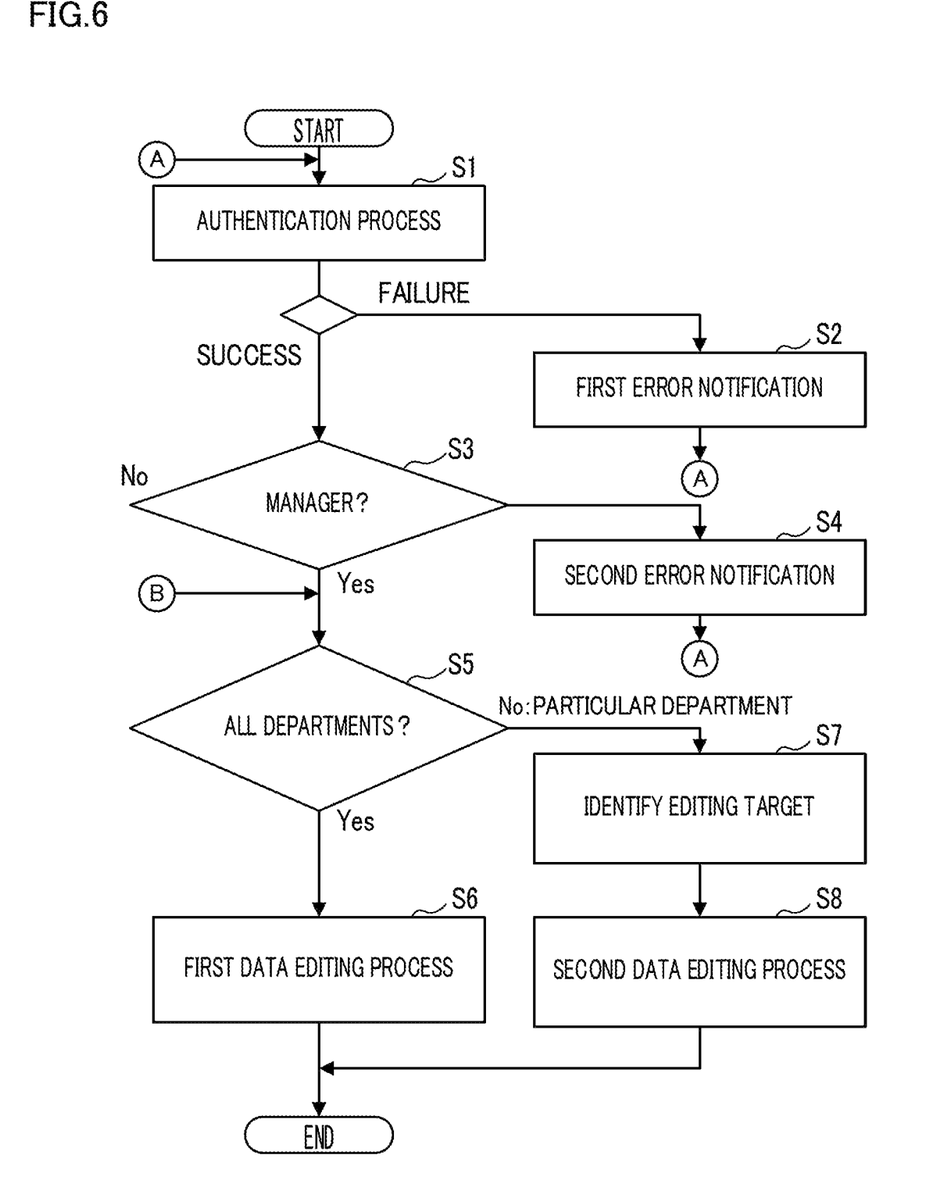
FIG. 6 is a flowchart showing an example of a procedure of a registered data editing process executed by the host apparatus.

In the host apparatus 8, the data editing portion 8c executes the registered data editing process, for example, by the procedure shown in FIG. 6. This makes it possible to reduce the load of the apparatus manager for editing the registered data D01, without increasing the apparatus manager.

In the present embodiment, the registered data DO1 includes the registered user data D1, department master data D2, and the management master data D3 (see FIG. 1).

As shown in FIG. 3, each piece of individual user data D10 includes a registrant code D11, a registrant name data D12, a registered authentication data D13, a belonging department code D14, and an individually permitted function data D15 (see FIG. 3).

The registrant code D11 is an identification code of a user. The registrant name data D12 represents a name of the user. The registered authentication data D13 is authentication data of the user. For example, the registered authentication data D13 includes a user ID and a password.

The belonging department code D14 is an identification code of the department to which the user belongs. The belonging department code D14 is an example of belonging department data.

The individually permitted function data D15 represents a range of image processing functions that are permitted to be used by the user. The image processing functions are provided by the image processing apparatus 10. For example, each piece of individually permitted function data D15 indicates, for each of a plurality of image processing functions that are provided by the image processing apparatus 10, whether or not the user is permitted to use the image processing function.

As described above, when the authentication process has succeeded, the job control portion 5b causes the image processing portion to execute the image processing in accordance with a processing request that is input. When doing so, the job control portion 5b causes the image processing portion to execute the image processing in the range of image processing functions that are indicated by the individually permitted function data D15 as permitted.

Figure 4:
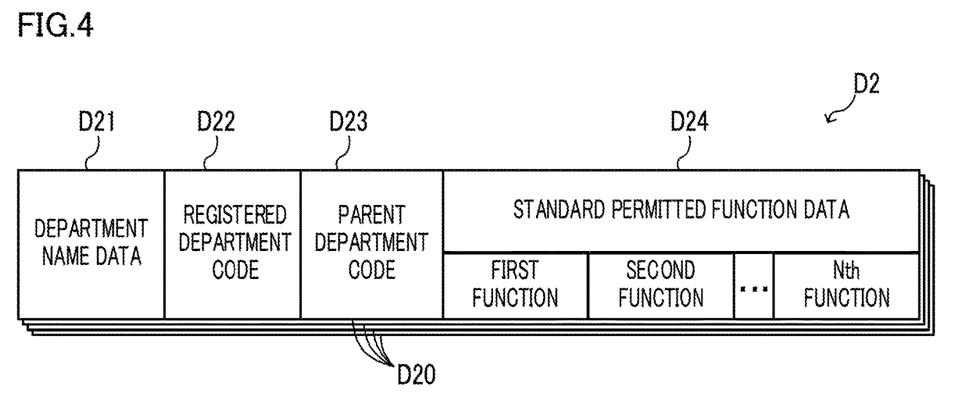
FIG. 4 is a diagram showing an example of a configuration of department master data constituting a part of the registered data that is edited by the host apparatus.

As shown in FIG. 4, the department master data D2 includes a plurality of pieces of registered department data D20. The plurality of pieces of registered department data D20 correspond to a plurality of departments that are candidates for the departments to which the plurality of users belong.

Each piece of registered department data D20 includes a department name data D21, a registered department code D22, a parent department code D23, and a standard permitted function data D24.

In each piece of registered department data D20, the department name data D21 represents a name of a department, the registered department code D22 is an identification code of the department, and the parent department code D23 is an identification code of a department to which directly belongs the department indicated by the registered department code D22.

The parent department code D23 is set to any one of a plurality of registered department codes D22 included in the department master data D2. By including the parent department code D23, the department master data D2 indicates subordinate relation among a plurality of departments that are candidates for the departments to which the plurality of users belong. The department master data D2 is an example of department hierarchical data.

The standard permitted function data D24 indicates a range of image processing functions that are permitted to be used by users belonging to a corresponding department. For example, the standard permitted function data D24 indicates, for each of the plurality of image processing functions that are provided by the image processing apparatus 10, whether or not the image processing function is usable.

When setting data for each piece of individual user data D10, the data editing portion 8c sets an initial value of the individually permitted function data D15 in correspondence with the belonging department code D14. Specifically, the data editing portion 8c sets, as the initial value of the individually permitted function data D15, a piece of standard permitted function data D24 corresponding to a registered department code D22 that indicates the same department as that indicated by the belonging department code D14.

Figure 5:
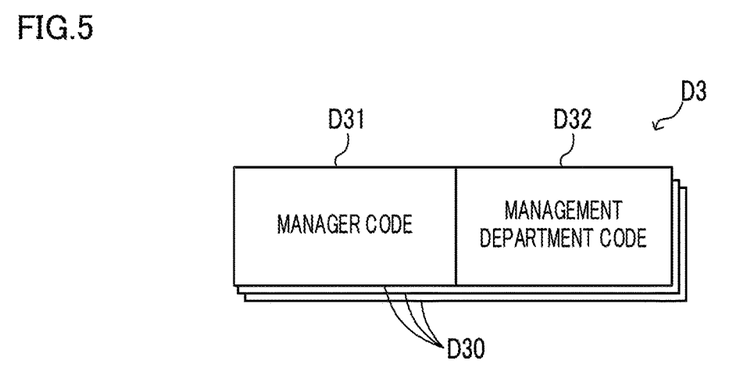
FIG. 5 is a diagram showing an example of a configuration of management master data constituting a part of the registered data that is edited by the host apparatus.

As shown in FIG. 5, the management master data D3 includes a plurality of pieces of manager data D30. The plurality of pieces of manager data D30 correspond to a plurality of managers who have the authority to edit the registered data D01. The plurality of managers are part of the plurality of users corresponding to the plurality of pieces of individual user data D10. Each of the plurality of pieces of manager data D30 includes a manager code D31 and a management department code D32.

The manager code D31 is an identification code of the manager. The manager code D31 is set to the registrant code D11 of any one of the plurality of pieces of registered user data D10. That is, each of the plurality of pieces of manager data D30 is associated with any one of the plurality of pieces of registered user data D10 by the registrant code D11.

The management department code D32 is data that corresponds to all departments or a particular department. The management department code D32 is an example of management department data.

In the present embodiment, the management department code D32 is set to either a predetermined all-department code or any one of a plurality of registered department codes D22 included in the department master data D2. The all-department code is an example of data indicating corresponding to all departments.

The management department code D32 set to the all-department code is an example of non-restriction data corresponding to all departments. In addition, the management department code D32 set to any one of the plurality of registered department codes D22 is an example of restriction data corresponding to a particular department.

As described below, the management department code D32 is data that is used to identify a range of the registered data DO1 that can be edited.

When the management department code D32 is set to any one of the plurality of registered department codes D22, a department indicated by a code set in the management department code D32 is the particular department.

A user corresponding to the non-restriction data is an apparatus manager who has an authority to edit all the registered data D01.

On the other hand, a user corresponding to the restriction data is a department manager who has an authority to edit only particular data related to the particular department corresponding to the management department code D32 among the registered data D01.

The data editing portion 8c of the CPU 81 executes the registered data editing process when an editing start operation is performed on the operation device 84.

The execution of the registered data editing process by the data editing portion 8c realizes an example of a registered data editing method. In addition, the host apparatus 8 including the data editing portion 8c is an example of a registered data editing apparatus.

[Registered Data Editing Process]

The following describes an example of a procedure of the registered data editing process with reference to the flow-chart shown in FIG. 6.

In the following description, S1, S2, . . . are identification signs representing a plurality of steps of the registered data editing process. In the registered data editing process, first, the data editing portion 8c executes the process of step S1.

<Step S1>

In step S1, the data editing portion 8c displays, on the display device 85, a message that urges input of the input authentication data.

Furthermore, in step S1, when the input authentication data has been input via the operation device 84, the data editing portion 8c executes the authentication process while accessing the registered user data D1.

In the authentication process, the data editing portion 8c identifies target user data. The target user data is one of the plurality of pieces of individual user data D10 including a piece of registered authentication data D13 that matches the input authentication data.

When the data editing portion 8c can identify the target user data, the authentication process is a success. When the data editing portion 8c cannot identify the target user data, the authentication process is a failure.

When the authentication process has failed, the data editing portion 8c executes the process of step S2. On the other hand, when the authentication process has succeeded, the data editing portion 8c executes the process of step S3.

<Step S2>

In step S2, the data editing portion 8c executes a first error notification process, and moves the process to step S1.

In the first error notification process, it is notified to the user that the authentication process has failed. For example, in the first error notification process, the data editing portion 8c displays a predetermined error message on the display device 85.

<Step S3>

In step S3, the data editing portion 8c determines whether or not the target user data corresponds to the manager.

Specifically, in step S3, the data editing portion 8c executes a manager identifying process while accessing the registered data D01. In the manager identifying process, target manager data is identified from the plurality of pieces of manager data D30. The target manager data is one of the plurality of pieces of manager data D30 that is associated with the target user data.

In the present embodiment, the data editing portion 8c identifies, as the target manager data, one of the plurality of pieces of manager data D30 that includes a manager code D31 that indicates the same code as that indicated by the registrant code D11 of the target user data.

Upon identifying the target manager data, the data editing portion 8c determines that the target user data corresponds to a manager. On the other hand, when it cannot identify the target manager data, the data editing portion 8c determines that the target user data does not correspond to a manager.

Upon determining that the target user data does not correspond to a manager, the data editing portion 8c executes the process of step S4. On the other hand, upon determining that the target user data corresponds to a manager, the data editing portion 8c executes the process of step S5.

<Step S5>

In step S5, the data editing portion 8c determines which of the all-department code or any one of the registered department codes D22 the management department code D32 of the target manager data is.

Upon determining that the management department code D32 of the target manager data is the all-department code, the data editing portion 8c executes the process of step S6.

On the other hand, upon determining that the management department code D32 of the target manager data is any one of the registered department codes D22, the data editing portion 8c executes the process of step S7.

<Step S6>

In step S6, the data editing portion 8c executes a first data editing process to edit all the registered data D01.

In the first data editing process, the data editing portion 8c displays, on the display device 85, a first data editing screen showing that all the registered data DO1 is the candidate for editing.

Furthermore, in the first data editing process, the data editing portion 8c performs data editing in which all the registered data DO1 is the candidate for editing, in accordance with an editing input operation performed on the operation device 84.

The data editing includes changing existing data, deleting existing data, and adding new data.

When an ending operation is performed on the operation device 84 during the first data editing process, the data editing portion 8c ends the first data editing process, and ends the registered data editing process.

<Step S7>

In step S7, the data editing portion 8c executes an editing target identifying process. In the editing target identifying process, an editable target in the registered data DO1 is identified.

The editable target in the registered data DO1 is the particular data related to the particular department corresponding to the management department code D32.

In the present embodiment, the particular data includes particular user data and particular manager data, wherein the particular user data is a part of the plurality of pieces of individual user data D10, and the particular manager data is a part of the plurality of pieces of manager data D30.

The particular user data is one of the plurality of pieces of individual user data D10 that includes a belonging department code D14 that indicates a department that has a predetermined correspondence relation with the particular department that corresponds to the management department code D32 of the target manager data.

In the present embodiment, the particular user data includes first particular user data and second particular user data. The particular manager data includes first particular manager data and second particular manager data.

Specifically, the data editing portion 8c identifies, as the first particular user data, one of the plurality of pieces of individual user data D10 that includes a belonging department code D14 that indicates a department that is the same as the particular department.

That is, the first particular user data includes a belonging department code D14 that indicates a department that is the same as the particular department that corresponds to the management department code D32 of the target manager data.

Furthermore, the data editing portion 8c identifies, as the second particular user data, one of the plurality of pieces of individual user data D10 that includes a belonging department code D14 indicating a department that is subordinate to the particular department in the department master data D2.

That is, the second particular user data includes a belonging department code D14 that indicates a lower department that is subordinate to the particular department that corresponds to the management department code D32 of the target manager data.

Furthermore, the data editing portion 8c identifies, as the first particular manager data, one of the plurality of pieces of manager data D30 that includes a management department code D32 indicating a department that is the same as the particular department.

Furthermore, the data editing portion 8c identifies, as the second particular manager data, one of the plurality of pieces of manager data D30 that includes a management department code D32 indicating a department that is subordinate to the particular department in the department master data D2.

It is noted that in the editing target identifying process, the data editing portion 8c may include, in the particular user data, third particular user data that is one of the plurality of pieces of individual user data D10.

The third particular user data is one of the plurality of pieces of individual user data D10 that includes a belonging department code D14 indicating a department to which the particular department is subordinate in the department master data D2.

That is, the third particular user data includes a belonging department code D14 that indicates an upper department to which the particular department that corresponds to the management department code D32 of the target manager data is subordinate.

After executing the editing target identifying process, the data editing portion 8c executes the process of step S8.

<Step S8>

In step S8, the data editing portion 8c executes a second data editing process to edit the particular data among the registered data D01.

In the second data editing process, the data editing portion 8c displays, on the display device 85, a second data editing screen where the particular data is the candidate for editing.

Furthermore, in the second data editing process, the data editing portion 8c performs data editing in which the particular data is the candidate for editing, in accordance with an editing input operation performed on the operation device 84.

That is, in the second data editing process, the data editing portion 8c executes a data editing process in which the editing target is the particular user data that is one of the plurality of pieces of individual user data D10. Similarly, in the second data editing process, the data editing portion 8c executes a data editing process in which the editing target is the particular manager data that is one of the plurality of pieces of manager data D30.

When an ending operation is performed on the operation device 84 during the second data editing process, the data editing portion 8c ends the second data editing process, and ends the registered data editing process.

The apparatus manager and the department manager can edit the registered data DO1 via the host apparatus 8. In addition, when the registered data editing process is adopted, the department manager can edit a part of the registered data DO1 that is related to the particular department.

Accordingly, by registering the department manager, it is possible to reduce the load of the apparatus manager for editing the registered data D01, without increasing the apparatus manager.

For example, a user who belongs to the particular department is registered as the department manager. In this case, the department manager can only edit data on users who belong to a department related to the department manager him/herself. Thus the load of the department manager is small, too.

First Application Example

The following describes a first application example of the registered data editing process.

As described above, a user who belongs to the particular department may be registered as the department manager. In this case, the belonging department code D14 of the target user data and the management department code D32 corresponding to the particular department in the target manager data indicate the same department.

As described above, when a management department code D32 corresponds to the particular department, it means that the management department code D32 is the restriction data.

With the above taken into consideration, in the present application example, the belonging department codes D14 of the plurality of pieces of individual user data D10 that are associated with the plurality of pieces of manager data D30 also serve as the management department codes D32 of the plurality of pieces of manager data D30 that correspond to the particular department.

In the present application example, the management department code D32 can be set to either a non-restriction code or a restriction code, wherein the non-restriction code indicates corresponding to all departments, and the restriction code indicates not corresponding to all departments. The management department code D32 set to the non-restriction code is an example of the non-restriction data.

In the present application example, the data editing portion 8c identifies the particular department when the target manager data has been identified and the management department code D32 of the target manager data is not the non-restriction data.

Specifically, the data editing portion 8c determines that a department indicated by the belonging department code D14 of the target user data is the particular department, and executes the processes of steps S7 and S8 of the registered data editing process (see FIG. 6).

With the adoption of the present application example, the department manager is given an authority to edit a range of data in the registered data DO1 that is related to the department of the department manager him/herself.

Second Application Example

Next, the following describes a second application example of the registered data editing process.

In the present application example, when editing the manager data D30, the data editing portion 8c sets a permitted department range in accordance with the belonging department code D14 of a piece of individual user data D10 corresponding to the piece of manager data D30. The permitted department range is a range of departments that can be set in the management department code D32.

Furthermore, in the present application example, when editing the manager data D30, the data editing portion 8c restricts codes of departments that can be set in the management department code D32, to codes of departments in the permitted department range.

For example, the data editing portion 8c sets, in the permitted department range, a manager department that is a department indicated by the belonging department code D14 of a piece of individual user data D10 corresponding to the piece of manager data D30 that is the editing target.

In addition, the data editing portion 8c may set, in the permitted department range, the manager department and a department that is subordinate to the manager department in the department master data D2.

In addition, the data editing portion 8c may set, in the permitted department range: the manager department; a department that is subordinate to the manager department in the department master data D2; and a department to which the manager department is subordinate in the department master data D2.

Third Application Example

The CPU 51 of the image processing apparatus 10 may execute the registered data editing process. In this case, the control device 5 including the CPU 51 is an example of the registered data editing apparatus.

In addition, the CPU 81 of the host apparatus 8 may execute a part of the registered data editing process, and the CPU 51 of the image processing apparatus 10 may execute another part of the registered data editing process. In this case, the host apparatus 8 and the control device 5 of the image processing apparatus 10 are examples of the registered data editing apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A registered data editing method in which a processor executes a process to edit registered data that is accessed by an image processing apparatus, wherein when the registered data includes:
a plurality of pieces of individual user data that correspond to a plurality of users who use the image processing apparatus, each of the plurality of pieces of individual user data including registered authentication data and belonging department data; and
a plurality of pieces of manager data that are associated with any of the plurality of pieces of individual user data, each of the plurality of pieces of manager data including management department data that corresponds to all departments or a particular department,
the registered data editing method comprises:
the processor, when input authentication data has been input, identifying target user data that is one of the plurality of pieces of individual user data and includes a piece of registered authentication data that matches the input authentication data;
the processor identifying target manager data that is one of the plurality of pieces of manager data that is associated with the target user data;
the processor, when a piece of management department data of the target manager data is non-restriction data corresponding to all departments, executing a first data editing process to edit all the plurality of pieces of individual user data in accordance with an editing input performed on an operation device; and
the processor, when the piece of management department data of the target manager data is restriction data corresponding to the particular department, executing a second data editing process to edit particular user data that is a part of the plurality of pieces of individual user data in accordance with the editing input, wherein
the particular user data is one of the plurality of pieces of individual user data that includes a piece of belonging department data that indicates a department that has a predetermined correspondence relation with the particular department that corresponds to the piece of management department data of the target manager data.

2. The registered data editing method according to claim 1, wherein
when the belonging department data of the plurality of pieces of individual user data that are associated with the plurality of pieces of manager data also serves as the management department data of the plurality of pieces of manager data that corresponds to the particular department,
when the target manager data has been identified and the management department data of the target manager data is not the non-restriction data, the processor determines that a department indicated by the belonging department data of the target user data is the particular department, and executes the second data editing process.

3. The registered data editing method according to claim 1, wherein
when the registered data includes department hierarchical data that indicates subordinate relation among a plurality of departments that are candidates for departments to which the plurality of users belong,
the processor determines that the particular user data includes first particular user data and second particular user data, and executes the second data editing process, wherein
the first particular user data is one of the plurality of pieces of individual user data that includes a piece of belonging department data that indicates a department that is same as the particular department, and the second particular user data is one of the plurality of pieces of individual user data that includes a piece of belonging department data indicating a department that is subordinate to the particular department in the department hierarchical data.

4. A registered data editing apparatus comprising the processor that realizes the registered data editing method according to claim 1.

5. An image processing apparatus comprising:
- an image processing portion configured to execute image processing that includes a print process to form an image on a sheet;
- a control portion configured to control the image processing portion; and
- the registered data editing apparatus according to claim 4, wherein
- when the input authentication data has been input and the plurality of pieces of individual user data includes the piece of registered authentication data that matches the input authentication data, the control portion causes the image processing portion to execute the image processing in accordance with a processing request that is input.

* * * * *